March 8, 1955     R. ANXIONNAZ     2,703,477

ROTARY JET PROPULSION UNIT

Filed March 16, 1951     2 Sheets-Sheet 1

INVENTOR
René Anxionnaz
By Watson, Cole, Grindle & Watson

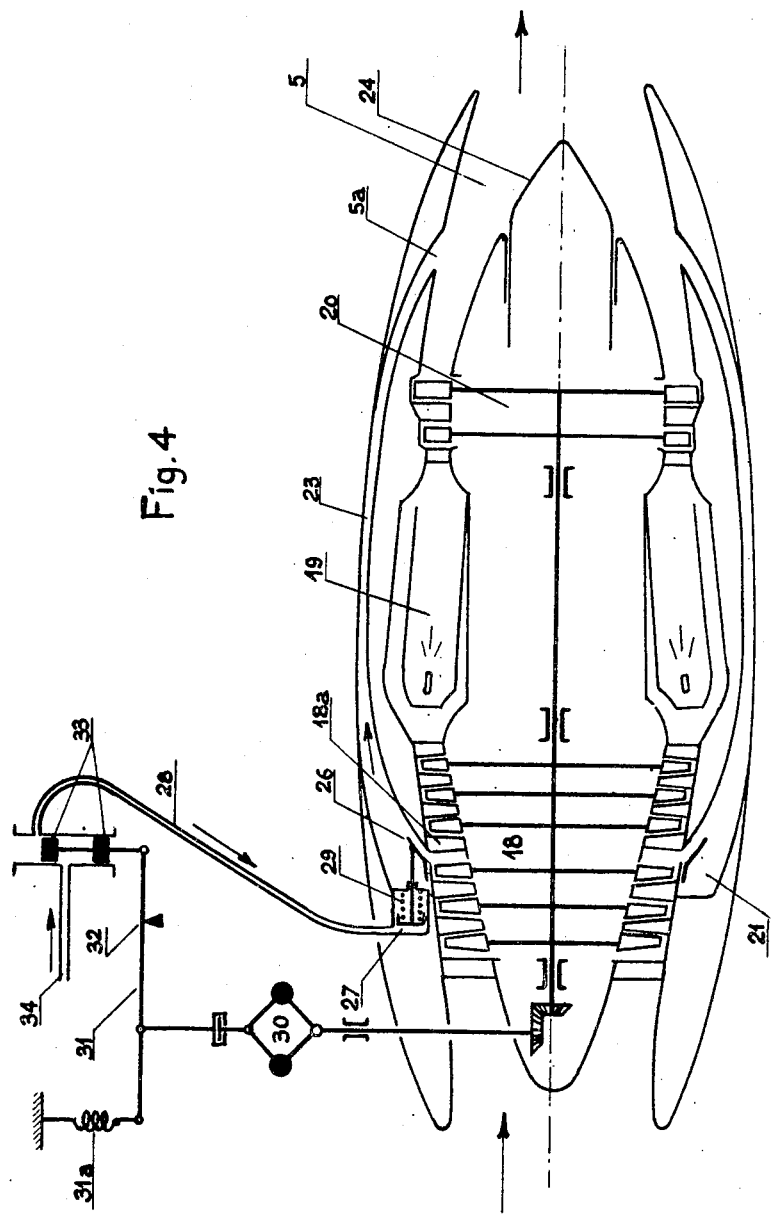

United States Patent Office 2,703,477
Patented Mar. 8, 1955

2,703,477

ROTARY JET PROPULSION UNIT

René Anxionnaz, Paris, France, assignor of one-half to Societe Rateau (Societe Anonyme), Paris, France, a company of France Application March 16, 1951, Serial No. 216,019

2 Claims. (Cl. 60—35.6)

It is known that when several compressors coupled in series are driven by one or more gas turbines and especially when a multi-stage compressor is driven by a single turbine (or several turbines fixed to the same shaft), there are difficulties of adaptation when the normal running speed varies. These difficulties are due to the very shape of the sharply descending characteristic curves of axial-flow compressors. In order that the compressor of a jet unit operate at a given point of a characteristic curve (e. g. the best efficiency curve), it is necessary to adjust accurately the flow of air through the compressor, whatever be the variations of the other parameters, such as forward speed of the aircraft, temperature of the combustion chamber, R. P. M. of the jet unit, altitude, etc. This adjustment is always complex and is usually achieved by varying the area of the nozzle.

Various arrangements have been proposed for resolving these difficulties and particularly those which formed the subject of U. S. A. Patent No. 2,245,954.

The present invention concerns rotary jet propulsion units, i. e., turbo-jets and turbo-props, having a multi-stage air compressor, a gas turbine and an exhaust nozzle.

The object of the present invention is to provide such units with balancing conduits between an intermediate compression zone of the compressor and an intermediate expansion zone of the turbine or the nozzle, which zones have substantially the same pressure at a given rate of operation, for instance at normal load. Hence at this rate, practically no fluid flows through this conduit. However, at lower rates, the pressure difference between the two zones increases and air starts flowing through this conduit, thus preventing in particular "choking" of the compressor since the latter can discharge part of the air through the conduit.

The description which follows, taken in conjunction with the accompanying drawing, and given simply as a non-limitative example, will enable the invention to be clearly understood, the features which are apparent from the description and drawing forming, of course, part of the said invention.

Fig. 4 shows a way of controlling the balancing device by a centrifugal governor.

Figure 1:
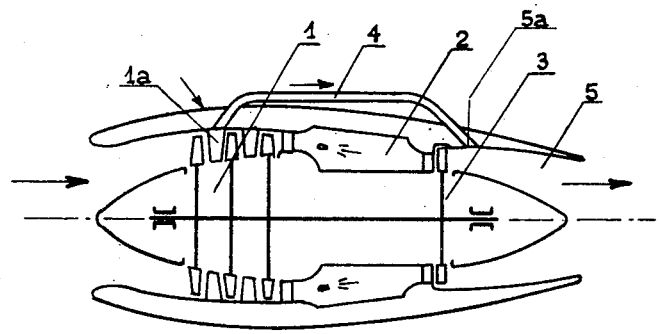
Figs. 1 and 2 are diagrammatic sections of single-flow turbo-jet units improved in accordance with the invention.

The jet unit shown in Fig. 1 comprises a multi-stage axial compressor 1, combustion chambers 2 and a gas turbine 3 driving the compressor. The gases leaving the turbine escape by way of the nozzle 5, which produces their final expansion, and the reaction jet.

A balancing conduit 4 directly connects an intermediate stage 1a of the axial compressor to a point 5a located downstream of the turbine. The intermediate stage 1a of the compressor, that is to say, the point where the balancing conduit starts, and the point 5a where it finishes, which may immediately follow the turbine wheel or may be in an intermediate zone of the expansion nozzle 5, are suitably chosen so that when the engine is running at a definite speed, for example, running at normal load, the pressures in 1a and 5a are equal to one another, and so that, at this speed, the balancing conduit consequently has no output.

When working at reduced loads, the functioning of the balancing conduit is produced automatically.

It is known that the compressors normally employed with gas turbines actually have a descending characteristic, that is to say, that the pressure which they supply decreases when the output increases. The result is that when the load of the driving unit is reduced, the output of the high-pressure compressor element tends to increase with respect to that of the low pressure element, and the pressure which the first mentioned element supplies tends to decrease in comparison with that which is supplied by the low-pressure element. Thus, if the pressure prevailing between the two elements of the compressor was, for example, the mean of the extreme pressures under normal load, it will be higher than the average at a reduced load.

On the other hand, for two successive turbine stages (when comparing, as already mentioned, the expansion in the nozzle 5 to that which would be produced in a turbine) it is known that when the total feeding pressure decreases, the pressure fall in the low-pressure stage decreases more rapidly than the pressure fall in the high pressure stage.

The pressure prevailing between the two turbine stages will thus tend to fall with respect to that prevailing between the two compressor stages and the output will be established at its own level in the balancing conduit by effecting automatically the desired adaptation.

It is thus not necessary to equip the balancing conduit with a control or regulating member.

The operation just described supposes that there is an intermediate stage of the compressor in which, for a given working load, for example, the normal working load or even the maximum working load, the air pressure is equal to the pressure at a point located down-stream of the turbine, either immediately after the latter, or in an intermediate zone of the expansion nozzle, considered then as a multi-stage turbine. It will be possible to determine the relative dimensions of the various engines in order that this condition is obtained and to determine, moreover, the dimension of the balancing conduit in order that it conveys, at reduced loads, the desired output necessary for the adaptation required.

If necessary, it is possible for a non-return valve or a blocking member, which may or may not be automatically controlled, to be inserted in the balancing conduit.

Figure 2:
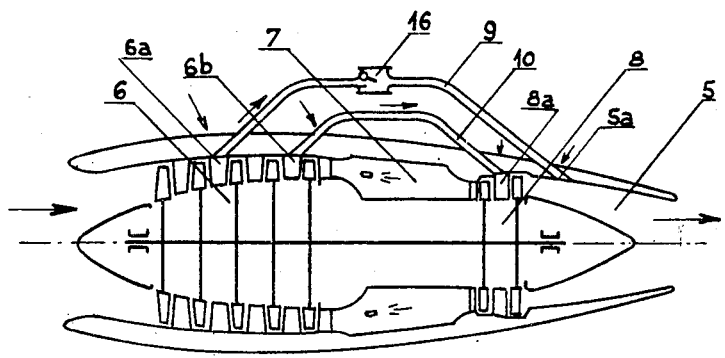

The turbo-jet unit of Fig. 2 comprises an axial compressor 6, combustion chambers 7 and a two stage turbine 8 driving the compressor.

A first balancing conduit 9 starts from a point disposed between two of the first stages 6a of the compressor and ends, as in the case of Fig. 1, at a point 5a disposed either immediately after the second turbine wheel, or after the commencement of the final expansion in the expulsion nozzle 5.

As the compressor is split up into a larger number of stages than in the case of Fig. 1, a second balancing conduit 10 starts from a point 6b between two of the last stages and ends at 8a between the two turbine wheels.

As indicated above, the relative dimensions of the various engines, the departure and arrival points of the balancing conduits and the dimensions of these latter may be determined in such manner that, at a certain working speed, for example, at normal load, the conduits have a zero or relatively very low output and that they function automatically at reduced loads in order to achieve the desired adjustment.

If necessary, however, a non-return valve 16 may be arranged on the conduit 9, this valve opening automatically to allow flow in the downstream direction, but preventing a return of the gases towards the compressor when running under extra load. In certain cases, it would also be possible to provide a similar valve on the conduit 10.

Figure 3:
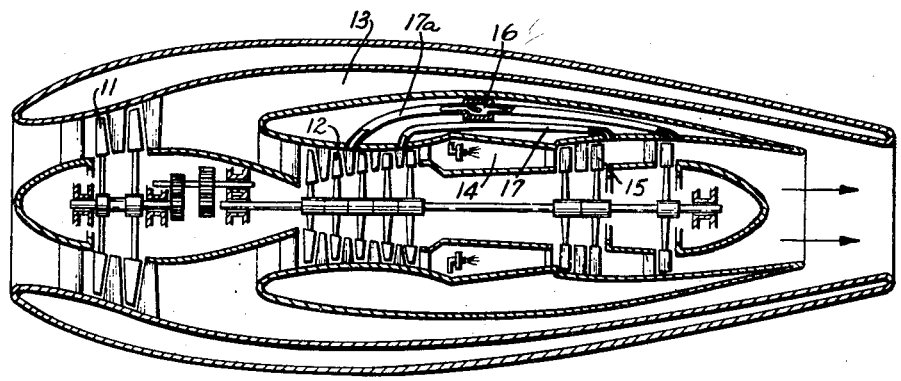
Fig. 3 shows a similar view of a twin-flow turbo-jet unit improved in accordance with the invention.

Fig. 3 shows, by way of example, a twin-flow turbo-jet unit in which a low-pressure compressor 11 feeds at the same time a high-pressure compressor 12 and an annular duct flow 13. Combustion chambers 14 are at the end of the high-pressure compressor and are followed by a single-stage or multiple-stage turbine 15 driving the high-pressure compressor direct and the low-pressure compressor through a reduction gear. The duct 13 by-passes the assembly constituted by the high-pressure compressor 12 the combustion chambers 14, the turbine 15 and its exhaust system 5 which are arranged in series flow relation.

Balance is assured, in this example, by an annular conduit 17, the start of which is at a judiciously chosen stage of the high-pressure compressor and which ends between the second and third wheels of the turbine.

As in the foregoing examples, the functioning of the conduit 17 is effected automatically without it being necessary to make use of a controlling or regulating member. If need be, it is possible to arrange a non-return or other valve in this conduit, as in the example of Fig. 2.

There may also be provided, in this case, a balancing pipe-system 17a ending after the turbines and any other combination of pipes connecting different points of the compression to other judiciously selected points of the expansion.

If the low-pressure compressor 11 is replaced by one or more coaxial air-screws, for example, there is provided a turbo-propulsion unit to which the aforementioned balancing devices are also applicable, and particularly those of Figs. 1 and 2.

Instead of letting the equilibrium act naturally according to the running speeds and the altitude conditions, it may be of interest, in certain cases, to bring the opening and the closing of the balancing conduit under the control of the speed of rotation of the jet and then to resort to an arrangement similar to that shown diagrammatically in Fig. 4.

This figure shows a single-flow turbo-jet unit comprising a multi-cell axial compressor 18, combustion chambers 19 and a two stage turbine 20 driving the compressor.

A balancing conduit 23 starts from an annular chamber 21 disposed around the body of the compressor and ends at an orifice 5a in an intermediate zone of the expansion nozzle 5, the section of which may be regulated by means of a sliding bulb 24. The orifice 5a is formed in the nozzle 5 in such manner as to cause the minimum of disturbance to the flow of gases coming from the turbine. The chamber 21 is connected by an annular orifice to an intermediate stage 18a of the compressor and the communication between this chamber and the said stage is controlled by an annular stop-valve 26 which is displaced parallel to the axis of the jet unit by pistons 27. The latter are subjected on one side to the thrust of oil under pressure supplied by the pipe 28 and on the other side to the action of opposing springs 29.

A centrifugal governor 30, controlled by the shaft of the jet unit through a bevel gear, acts on a rocker shaft 31 oscillating about a fixed point 32 and subjected to the action of a spring 31a, the said rocker shaft controlling the pistons 33 of an oil distributor.

When the speed of the jet unit increases, the governor 30 causes the left-hand portion of the rocker shaft 31 to lower and the pistons 33 of the distributor of oil under pressure to lift. The intake 34 for oil under pressure is then in communication with the pipe 28 and the rear face of the piston 27, thus causing the stop-valve 26 to close.

Conversely, when the speed of rotation decreases the pistons 33 assume a position corresponding to that of Fig. 4, and the pipe 28 is no longer fed. The piston 27 is then displaced towards the left, thereby opening the balancing conduit.

Any other system of controlling any type of stop-valve is obviously within the scope of the invention.

The device of Fig. 4 may be applied in a general manner and the valve provided in Fig. 2 may also be part of a similar control.

The various devices described above, as example for jet units, may be applied to all aviation gas turbines, and in particular to propeller-type turbo-propulsion units, whatever may be, in these apparatus, the distribution of the outputs between the propeller or propellers and the reaction jet formed by the exhaust gases.

What I claim is:

1. A jet propulsion engine comprising an assembly including a multistage high-pressure air compressor, a combustion chamber, a multistage gas turbine and an exhaust system arranged in series flow relation, said exhaust system ending with a rearwardly opening orifice, a by-pass duct arranged in parallel flow relation with said assembly, a low-pressure air compressor driven from said turbine and discharging into both said assembly and said duct, said compressors being so designed that the amount of air discharged by said low-pressure compressor is substantially greater than the amount of air sucked up by said high-pressure compressor, whereby a substantial amount of air discharged by said low-pressure compressor flows through said duct, a balancing conduit connecting an intermediate stage of said high-pressure compressor with an intermediate stage of said turbine, said stages being so selected that the pressures obtaining therein, at rated rotational speed of the engine, are substantially equal, and a further balancing conduit connecting another intermediate stage of said high-pressure compressor, upstream of the first-mentioned intermediate stage, with a part of said exhaust system upstream of said orifice, said last-mentioned stage and said part being so selected that the pressures obtaining therein, at said speed of the engine, are substantially equal.

2. An engine as claimed in claim 1, wherein the by-pass duct is of annular shape and is inwardly bounded by a smooth wall, the balancing conduits extending within the overall dimensions of said wall.

References Cited in the file of this patent

UNITED STATES PATENTS

| | | |
|---|---|---|
| 2,257,982 | Seippel | Oct. 7, 1941 |
| 2,354,213 | Jendrassik | July 25, 1944 |
| 2,464,724 | Sédille | Mar. 15, 1949 |
| 2,479,776 | Price | Aug. 23, 1949 |